US008211295B2

(12) United States Patent
Kuznicki et al.

(10) Patent No.: US 8,211,295 B2
(45) Date of Patent: Jul. 3, 2012

(54) PROCESS FOR EXTRACTION OF BITUMEN FROM OILSANDS

(75) Inventors: Steven M. Kuznicki, Edmonton (CA); William C. McCaffrey, Edmonton (CA); Murray R. Gray, Edmonton (CA); James A. Dunn, Calgary (CA)

(73) Assignees: The Governors Of The University Of Alberta, Edmonton, Alberta (CA); Imperial Oil Resource Limited, Calgary, Alberta (CA)

( * ) Notice: Subject to any disclaimer, the term of this patent is extended or adjusted under 35 U.S.C. 154(b) by 397 days.

(21) Appl. No.: 12/430,295

(22) Filed: Apr. 27, 2009

(65) Prior Publication Data
US 2009/0288994 A1 Nov. 26, 2009

Related U.S. Application Data

(60) Provisional application No. 61/048,303, filed on Apr. 28, 2008.

(30) Foreign Application Priority Data

Apr. 28, 2008 (CA) ..................................... 2630075

(51) Int. Cl.
*C10C 3/02* (2006.01)
*C10G 1/00* (2006.01)
(52) U.S. Cl. ............. 208/390; 208/44; 208/96; 208/118
(58) Field of Classification Search .................... 208/44, 208/96, 118, 390
See application file for complete search history.

(56) References Cited

U.S. PATENT DOCUMENTS

| 3,941,679 | A | 3/1976 | Smith et al. |
| 3,974,063 | A | 8/1976 | Owen et al. |
| 4,036,732 | A | 7/1977 | Irani et al. |
| 4,343,723 | A | 8/1982 | Rogers et al. |
| 4,356,079 | A | 10/1982 | Desaau |
| 4,452,691 | A | 6/1984 | Polomski et al. |
| 4,519,900 | A | 5/1985 | Angevine et al. |
| 4,596,651 | A | 6/1986 | Wolff et al. |
| 4,877,762 | A | 10/1989 | Ward et al. |
| 6,412,557 | B1 | 7/2002 | Ayasse et al. |
| 6,617,482 | B1 | 9/2003 | Venkat et al. |
| 7,205,448 | B2 | 4/2007 | Gajda et al. |
| 7,448,186 | B2 | 11/2008 | Siniaguine |
| 2006/0272983 | A1 | 12/2006 | Droughton et al. |
| 2007/0181465 | A1 | 8/2007 | Collette |
| 2009/0288994 | A1* | 11/2009 | Kuznicki et al. ............. 208/390 |

FOREIGN PATENT DOCUMENTS

| EP | 0134333 | 3/1985 |
| WO | WO-2005/075608 A1 | 8/2005 |

OTHER PUBLICATIONS

"Standard Test Method for Distillation of Petroleum Products at Reduced Pressures," ASTM Designation: D 1160-1187, 1989.

Abu-Khader, M. M. et al., "Influence of High Asphaltene Feedstocks on Processing," Oil and Gas Science and Technology, 2007, vol. 62, No. 5 pp. 715-722.
Agrawala, M. et al., "An Asphaltene Association Model Analogous to Linear Polymerization," Ind. Eng. Chem. Res., 2001, vol. 40, pp. 4664-4672.
Akcarzadeh, Kamran et al., "Methodology for the Characterization and Modeling of Asphaltene Preceipitation from Heavey Oils diluted with n-alkanes," Energy & Fuels, 2004, vol. 18, pp. 1434-1441.
Alberta Chamber of Resources, Oil sands technology roadmap. http://www.aer-alberta.com.ostr/OSTR report.pdf. 2004 (retrieved on Jan. 7, 2006).
Alberta's Oil Sands-Overview, Alberta Energy, Governement of Alberta, 2006, pp. 2, http://www.energy.gov.ab.ca/OilSands/pdfs/osgenbrfpdf. Retreived on Feb. 14, 2008.
Botchwey, C. et al., "Kinetics of Bitumen-Derived Gas Oil Upgrading Using a Commercial NiMo/Al2O3 Catalyst," Jun. 2004, vol. 82 pp. 478-487.
Canada's Oil Sands—Opportunities and Challenges to 2015: An Update, National Energy Board, Jun. 2006, pp. 17, http://www.Neb.gc.ca/elf-sni/rnrgynfmtn/nrgyrprt/1snd/1snd-eng.html. Retrieved on Aug. 14, 2007.
Carrado, K. A. et al., "HDS and deep HDS activity of CoMoS-mesostructured clay catalysts," Catalysis Today, 2006, vol. 116 pp. 478-484.
Cejka, J., "Zeolites: Structures and Inclusions Properties," Encyclopedia of Supramolecular Chemistry, 2004, pp. 1623-1630.
Ding L. et al., "HDS, HDN, HAD, and hydrocracking of model compounds over Mo-Ni catalysts with various acidities," Applied Catalysis, 2007, vol. 319 pp. 25-37.
Ellis, J. et al., "Removal of nitrogen compounds from hydrotreated shale oil by adsorption on Zeolite," Fuel, 1994, vol. 73, No. 10, pp. 1569-1573.
Gentzis, T. et al., "Microscopy of fouling deposits in bitumen furanances," 2000, Fuel, vol. 79, pp. 1173-1184.
Gray, Murray R. et al., "Role of Catalyst in Hydrocracking of Residues from Alberta Bitumens," Energy & Fuels, 1992, vol. 6, pp. 478-485.
Hackett, Peter, DR., "Alberta's Ingenuity," Presentation at QuantumWorks: Annual General Meeting, Oct. 2007.
Jaremko, G., "Researcher cracks secrets of 'ugly' bitumen: Steve Kuznicki heads team on the lookout for innovative ways to extract valuble commondity from oilsands," Edmonton Journal (Alberta), Apr. 23, 2007.
Kim, J. H. et al., "Ultra-deep desulfurization and denitrogenation of diesel fuel by selective adsorption over three different adsorbents: A study on adsorptive selectivity and mechanism," Catalysis Today, 2006, vol. 111, pp. 74-83.

(Continued)

Primary Examiner — Timothy Vanoy
(74) Attorney, Agent, or Firm — Millen, White, Zelano & Branigan, P.C.

(57) ABSTRACT

Bitumen within raw oilsands may be cracked and fully recovered by light hydrocarbon extraction following exposure to modified natural zeolite catalysts under cracking conditions. The recovered bitumen is reduced in viscosity, with lower boiling point distributions. Effective cracking of oilsands bitumen using economical, abundant and readily disposable natural zeolites represents a significant step towards a water-less and environment friendly extraction process.

27 Claims, 3 Drawing Sheets

OTHER PUBLICATIONS

Kowalczyk, P. et al., "Porous structure of natural and modified clinoptilolites," Journal of Colloid and Interface Science, 2006, vol. 297, pp. 77-85.

Kuznicki, S. M. et al., "Advances in natural Zeolite bitumen cracking," 57$^{th}$ Canadian Chemical Engineering Conference—2007, Oct. 2008, pp. 28-31.

Kuznicki, S. M. et al., "Natural Zeolite bitumen cracking and upgrading," 2007, Microporous and Mesoporous Materials, 2007, vol. 105, pp. 268-272.

Kuznicki, S.M. et al., "Natural zeolite-based catalysts for heavey oil applications," 44$^{th}$ Annual Meeting of the Clay Minerals Society: Enchanted Clays Conference, Jun. 2-7, 2007 pp. 117.

Marcilly, C., "Zeolites in the Petroleum Industry," 2004, pp. 1599-1609.

Miki, Y. et al., "Role of Caralyst in Hydrocracking of Heavy Oil," Journal of Catalyst, 1983, vol. 83, pp. 371-383.

Mossop, G. D. et al., "Geology of the Athabasca Oil Sands," Science, Jan. 11, 1980, vol. 207 pp. 145-152.

Oil Reserves and Production Brochure, Alberta Energy, Governement of Alberta, 2006, pp. 3, <http://www.energy.gov.ab.ca/Oil/pdfs/ABOilReserves.pd. Retrieved on Feb. 14, 2008.

Peramanu, S. et al., "Molecular Weight and Specific Gravity Distributions for Athabasca and Cold Lake Bituments and Their Saturate, Aromatic, Resin, and Asphaltene Fractions," Ind. Eng. Chem. Res., 1999, vol. 38, pp. 3121-3130.

Rana, M. S. et al., "A review of recent advances on process technologies for upgrading heavy oils and residua," Fuel, 2007, vol. 86, pp. 1216-1231.

Tatsumi, T., "Zeolites: Catalysis," Encyclopedia of Supramolecular Chemistry, 2004, pp. 1610-1616.

Thomas, C.L. et al., "A History of Early Catalytic Cracking Research at Universal Oil Products Company," Heterogeneous Catalysis, 1983, pp. 241-245.

Vitra, Robert L. "Zeolites," 2006 Minerals Yearbook, Jun. 2007.

Weitkamp, Jens, "Zeolites and Catalysis," Solid State Ionics, 2000, vol. 131, pp. 175-188.

Zhao, S. et al., "The Chemical Compositions of Solubility Classes from Athabasca Bitumen Pitch Fractions," Petroleum Science and Technology, 2003, vol. 21, No. 1 & 2, pp. 189-199.

Breck, D., "Zeolite Molecular Sieves," John Wiley & Sons, Inc., 1974, Ch. 3 & 7, pp. 186-244, 529-588.

Office Action for related Canadian Patent Application No. 2,630,075 dated Dec. 15, 2011.

* cited by examiner

PROCESS FOR EXTRACTION OF BITUMEN FROM OILSANDS

This application claims the benefit of the filing date of U.S. Provisional Application Ser. No. 61/048,303 filed Apr. 28, 2008.

FIELD OF THE INVENTION

The present invention relates generally to the extraction of petroleum from oilsands. More particularly, the present invention relates to the extraction of petroleum from oilsands using a light hydrocarbon solvent.

BACKGROUND OF THE INVENTION

The primary method of extracting bitumen from pit-mined oilsands is by hot water extraction. That is, oilsands are slurried with hot water to solubilize entrained petroleum to some degree, and to permit transport by pipeline to an extraction plant, where the slurry is separated into fractions for recovery and processing of bitumen. This process consumes multiple barrels of fresh water per barrel of oil produced and generates a high volume of waste that is difficult to treat prior to release. Long term use of hot water extraction for high output oil production raises concerns about both water management and environmental impact. Furthermore, the bitumen fraction recovered by this method remains highly viscous and must further be diluted with solvents prior to further pipeline transport.

Bitumen is generally recovered for upgrading by skimming of froth from the aforementioned slurry, followed by cracking of the bitumen froth into smaller hydrocarbon fractions. Thermal cracking, hydrocracking, and catalytic cracking and are all common methods for upgrading.

Synthetic zeolites are widely used as cracking catalysts in fluid catalytic cracking and hydro-cracking processes. Zeolites have an open structure with small, regular pores capable of accommodating a wide variety of cations for ready exchange in solution. These pores are also suitable for confining and filtering molecules. The hydrogen form of zeolites (prepared by ion-exchange) are powerful solid-state acids, and can facilitate a host of acid-catalyzed reactions, such as isomerisation, alkylation, and cracking. In the petroleum industry, crude oil distillation fractions may be heated in a furnace and passed to a reactor, where the crude is exposed to the zeolite catalyst. Several reactors may be used at varying temperatures until adequate separation is achieved. Hydrogen and synthetic catalyst are generally recycled.

Chabazite, a natural zeolite with platy morphology and a highly acidic surface, is a proven cracking catalyst and a natural sorbent. Kuznicki et al (Apr. 2, 2007, "Natural zeolite bitumen cracking and upgrading"; Microporous and Mesoporous Materials 105; 268-272) showed that natural zeolites such as chabazite may be modified to produce strong acids, and that such acids could be used to catalyze cracking of bitumen in raw oilsand samples with minimal coking. The resulting petroleum fractions were then extracted with toluene to produce a less viscous bitumen fraction.

U.S. Pat. No. 4,596,651 describes a process for extracting bitumen from tar sands using solvents. Specific and non-specific solvents are used in series to obtain bitumen low in fines and asphaltenes. For example, tar sands may first be slurried with a nonspecific solvent to dissolve most of the available bitumen, and then a specific solvent is added to precipitate the asphaltenes and fines from the slurry.

U.S. Pat. No. 4,036,732 discusses solvents that may be employed in the extraction of bitumen and asphaltenes from oilsands. Fresh tar sands are initially slurried with small amounts of water or an aqueous phenol solution, and paraffinic solvents such as pentane may be used to separate desirable bitumen from asphaltenes.

U.S. Pat. No. 3,941,679 describes a waterless bitumen extraction method. Raw oilsands are mixed with a non-aqueous extraction solvent that contains trichlorofluoromethane. The solvent must then stripped from the fluid phase to isolate the hydrocarbonaceous substances.

U.S. Pat. No. 6,412,557 describes an in situ bitumen recovery and upgrading process from deep oilsands. An upright combustion front is initiated from a vertical injection well and is propagated laterally across an oilsands formation towards a production well. The production well has a horizontal leg extending towards the injection well so as to be in the path of the combustion front. A hydrocracking catalyst is embedded within the horizontal leg such that the hot combustion gases react with oil over fresh catalyst as the combustion front advances, providing in situ upgrading during production.

SUMMARY OF THE INVENTION

In a first aspect, there is provided a method for recovering bitumen from a petroleum feedstock, the method comprising the steps of: exposing the petroleum feedstock to an acidified zeolite catalyst; heating the feedstock and catalyst to a cracking temperature; and contacting the cracked feedstock with a light hydrocarbon solvent to extract bitumen therefrom.

In an embodiment, the feedstock is raw oilsand.

The zeolite may be a naturally occurring zeolite such as chabazite or clinoptilolite. When modified to become a suitable catalyst, the zeolite may be a strong acid.

In an embodiment, the cracking temperature is suitable to crack asphaltenes within the feedstock. The temperature may, for example, be 200 degrees Celsius or greater. In certain embodiments, the cracking temperature may be 300 degrees Celsius or greater.

In suitable embodiments, the light hydrocarbon may be pentane, hexane, or another light hydrocarbon solvent in which undesirable petroleum residuum are not soluble.

The cracked feedstock may be cooled prior to contact with the solvent.

In a second aspect, there is provided a method for recovering hydrocarbons from asphaltene-bearing feedstock, the method comprising the steps of: exposing the asphaltene-bearing feedstock to an acidified zeolite catalyst; heating the feedstock and catalyst to a cracking temperature; and contacting the cracked feedstock with a light hydrocarbon solvent to extract soluble cracked products from the feedstock.

In an embodiment, the feedstock is raw oilsand.

The zeolite may be a naturally occurring zeolite such as chabazite or clinoptilolite. When modified to become a suitable catalyst, the zeolite may be a strong acid.

In an embodiment, the cracking temperature is suitable to crack asphaltenes within the feedstock. The temperature may, for example, be 200 degrees Celsius or greater. In certain embodiments, the cracking temperature may be 300 degrees Celsius or greater.

In suitable embodiments, the light hydrocarbon may be pentane, hexane, or another light hydrocarbon solvent in which undesirable petroleum residuum are not soluble. The cracked feedstock may be cooled prior to contact with the solvent.

In another aspect, there is provided a method for cracking asphaltenes and recovering cracked products, the method comprising the steps of: providing a starting material containing asphaltenes; exposing the starting material to an acidified zeolite catalyst; heating the starting material and catalyst to a cracking temperature to produce a cracked material containing cracking products; and contacting the cracked material with a light hydrocarbon solvent to extract soluble cracking products from the cracked material.

In an embodiment, the zeolite is chabazite or clinoptilolite, which may be acidified to produce a strong acid. The cracking temperature may be greater than 300 degrees Celsius, resulting in cracked products readily extractable with a light hydrocarbon solvent. The light hydrocarbon solvent may be pentane, hexane, or another light hydrocarbon solvent in which undesirable petroleum residuum are not soluble.

In another aspect, there is provided an acidified natural zeolite catalyst, for use in catalytic cracking of asphaltenes. The zeolite may be clinoptilolite or chabazite.

In an embodiment, the method may further comprise the step of cooling the cracked feedstock prior to extraction.

In accordance with a third embodiment, there is provided a method for cracking asphaltenes comprising the steps of exposing the asphaltenes to a modified natural zeolite catalyst; and heating the asphaltenes and catalyst to a temperature greater than 200 degrees Celsius.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
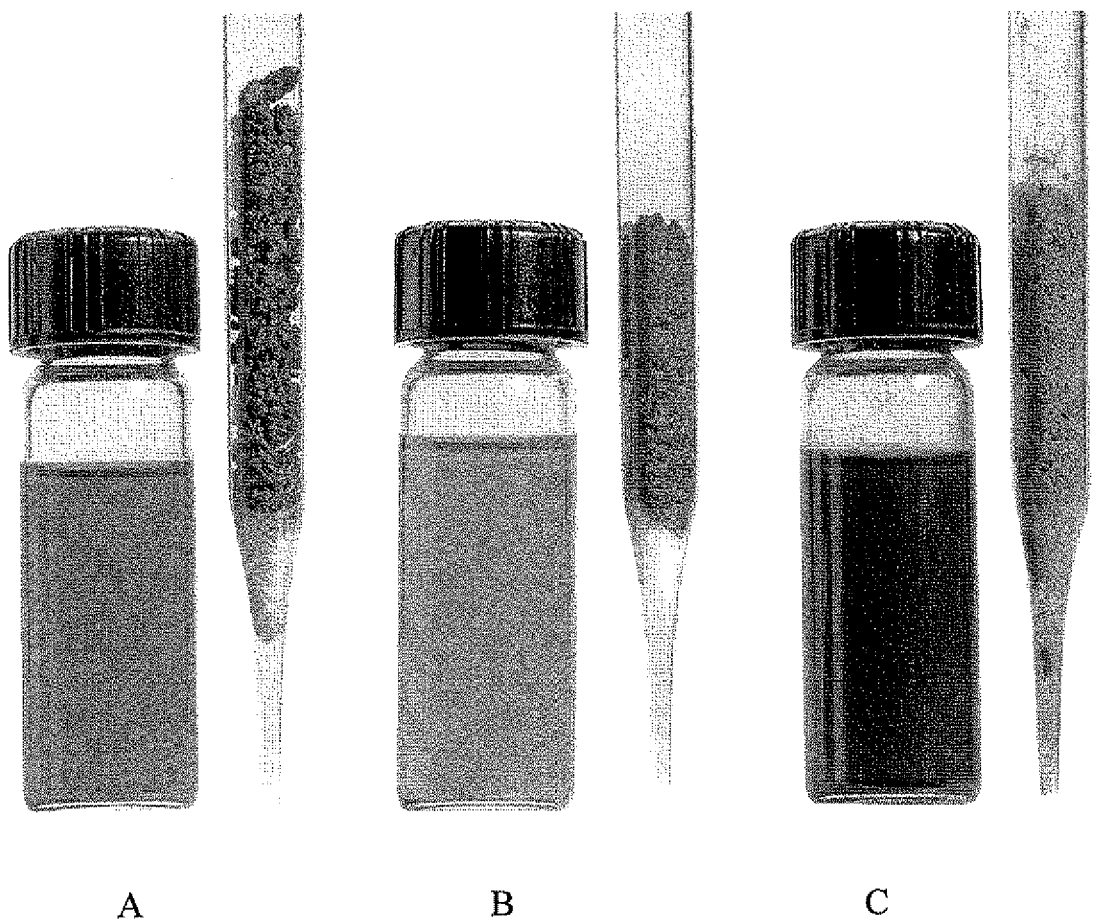
FIG. 1 is a photograph showing extracted bitumen and remaining sand following three independent oilsands extractions.

Generally, the present invention provides a method for efficient cracking of bitumen within raw oilsand, and extraction of the resulting upgraded bitumen using light hydrocarbon solvents.

Natural zeolite catalysts and light hydrocarbon solvents are used to crack and extract the bitumen, respectively. Due to their low cost and relative abundance, these zeolite catalysts do not require regeneration and may simply be returned to the earth along with the waste sand, which is substantially free of petroleum.

As the modified zeolites chabazite and clinoptilolite appear to preferentially crack very heavy hydrocarbons/asphaltenes, substantially all of the petroleum fractions may be extracted from the oilsand without need for slurrying with hot water. The resulting extract includes low-viscosity, readily pipelined petroleum fractions, while excluding residuum.

Light hydrocarbons extracted from the oilsands by this method may be reused as solvents for extraction of bitumen from further oilsands.

It is therefore conceivable that such a process, in proper scale, may be conducted in close proximity to the mine face, reducing costly pipeline transport of oilsand. Water waste and environmental impact are minimized by avoiding hot water use and discharge of slurries and waste into tailings ponds.

Modified Natural Zeolites as Catalysts

Synthetic zeolite catalysts have been manufactured for use in catalytic cracking of hydrocarbons, however these zeolites are expensive to produce, as they are generally engineered to have a certain mineral content, reactivity, pore size, or range of pore sizes for use in filtration/sorting and catalysis.

By contrast, natural zeolites such as chabazite and clinoptilolite are inexpensive due to their relative abundance, ease of mining, and lightweight nature. Although natural zeolites are somewhat inhomogeneous due to their natural formation, both chabazite and clinoptilolite have a large surface area due to a platy morphology. Moreover, modified natural zeolites may be modified to produce stronger acids than other previously reported cracking catalysts, including zeolite Y. These acidified natural zeolites are able to catalyze cracking of oilsands bitumen to increase the yield of pentane- and/or hexane-extractable fractions when compared to other cracking catalysts, or to thermal visbreaking.

Moreover, catalytic cracking using modified natural zeolites is successful at less stringent conditions than alternate catalytic cracking procedures, and results in a petroleum fraction that is fully extractable from the oilsand matrix using inexpensive, readily available light hydrocarbon solvents.

While the Applicants do not wish to be bound to any particular theory, it is hypothesized that the physical and chemical nature of natural zeolites cooperate to catalyze preferential cracking of very large hydrocarbon molecules/asphaltenes within the oilsand matrix. In other words, natural zeolite cracking in accordance with the present method reduces the average molecular weight of bitumen asphaltenes (which in uncracked form are insoluble in pentane and hexane) to produce lighter, less viscous fractions, enabling near complete extraction of petroleum from the oilsand using only light hydrocarbon solvents.

Cracking

Raw oilsands are mixed with modified natural zeolite catalyst and exposed to appropriate cracking conditions to facilitate the desired degree of bitumen cracking within the oilsand matrix.

Generally, the cracking temperature and time will depend on the composition of the bitumen and of the zeolite catalyst.

For example, a stronger acid catalyst may require less heat and less time to achieve suitable cracking than would be required using a weaker acid catalyst. Similarly, cracking of an asphaltene-laden oilsand sample may require more time and higher temperatures than a sample having fewer entrained asphaltenes.

As the zeolites and oilsand compositions may differ from one batch to another, a certain degree of observation and experimentation will assist in determining appropriate adjustments to cracking conditions. If a certain result is desired, for example a certain extracted bitumen viscosity or average molecular weight, minor alterations in cracking temperature or time may be made to achieve this end.

The cracking temperature should typically be raised to at least 200 degrees Celsius, and preferably to at least 300 degrees Celsius to facilitate cracking of bitumen within the oilsand matrix.

The oilsand and catalyst mixture is then cooled prior to the extraction step to maintain the light hydrocarbons in liquid form during extraction.

Extraction

Pentane and hexane are solvents typically used in bitumen processing to solubilize or extract light hydrocarbon fractions. As asphaltene is insoluble in these light hydrocarbon solvents, they are typically used to solubilize lighter hydrocarbons while precipitating heavy hydrocarbons/asphaltenes.

In the present method, it is desirable to use an extraction solvent that is readily available, inexpensive, and may be easily isolated from the extract for reuse or left within the extract for pipeline transport. Pentane and hexane are desirable hydrocarbons normally present within extracted bitumen, and are able to dissolve most hydrocarbons, while excluding residuum such as uncracked asphaltenes.

Thus, specific light hydrocarbons recovered from the oilsands extract could be recycled as solvents to extract further hydrocarbons from oilsands. Such system would further advance the economical and environmental objectives of the present method.

Experimental Examples

Initial Characterization of Oilsand

A representative sample of Athabasca oilsands was obtained from the Syncrude Facility at Mildred Lake near Fort McMurray, Alberta, Canada. Typical API gravity and viscosity ranges of Athabasca bitumen are 7.70-8.05° API and 166-323 Pa·s, respectively (Genzes et al. 2003, Peramanu et al. 1999). The weight and molar average molecular weights of this bitumen, as determined from SARA (Saturates, Aromatics, Resins, and Asphaltenes) fractions by vapour pressure osmometry and gel permeation chromatography, were 529-585 Da (molar average) and 2.079 kDa (weight average) (Peramanu et al. 1999). Asphaltene content is 17.28-18.8 wt % (Genzes et al. 2003, Peramanu et al. 1999).

Preparation of Catalysts

Standard commercial zeolite Y was obtained as ammonium-exchanged fluidized catalytic cracking (FCC) microspheres from Engelhard Corporation.

Raw sedimentary chabazite from the Bowie deposit was obtained from the GSA Resources of Tucson, Ariz. Clinoptilolite samples were obtained from the Saint Clouds deposit in New Mexico, USA, and the Werris Creek deposit in New South Wales, Australia.

All zeolite samples were finely ground to <200 mesh and, with the exception of zeolite Y, ammonium-exchanged in a slightly acidic environment for 6 to 8 hours. The sodium-rich chabazite was double-exchanged with a molar excess of ammonium ions. Samples were then calcined to ~450° C. under nitrogen flow to convert to the hydrogen form for catalytic cracking reactions.

Cracking Conditions

Thermal and catalytic cracking reactions were performed in custom-designed micro batch reactors loaded with approximately 13 g of a 10:1 weight mixture of oilsands and the selected catalyst. The reactor was sealed and leak tested at >200 psi, then purged with nitrogen gas. Samples were heated in a tube furnace at a constant ramp rate of 10° C./min, followed by a 1 hour soaking phase at ~400° C. Reactions were abruptly stopped by quenching in cold water.

Extraction Using Light Hydrocarbon Solvent

A small portion (approximately 1.1 g) of the reacted oilsands and catalyst mixture was transferred into a disposable pipette, and the hydrocarbon products were extracted using 3 mL of hexane, pentane or toluene by a once-through process. The remaining 10 g of the reacted mixture was transferred into a double thickness, porous extraction thimble and the hydrocarbon products were recovered by a 6-hour reflux at moderate temperature in a Soxhlet apparatus, using 150 mL of the selected organic solvent. Finally, the solvents were evaporated under vacuum pressure, and the bituminous products were recovered and dried at room temperature.

Characterization of Reaction Products

The boiling point distributions of the products were measured by vacuum distillation thermogravimetry, a process analogous to ASTM D1160, using a Netzsch Thermo Gravimetric Analyzer. Under vacuum pressure, 10-12 mg of the organic solvent-extracted product was heated from 30° C. to 350° C. at a constant ramp rate of 10° C./min, and then maintained at 350° C. for an additional 20 minute period. Boiling points under vacuum were converted to atmospheric pressure values using the ASTM D1160 temperature-pressure conversion table for petroleum hydrocarbons in order to approximate standard petroleum fractions (ASTM Manual on HC Analysis 1989).

Visual Characterization of Bitumen Recovery

Visual comparison of the exhausted sands and bitumen recovered by a once-through pentane extraction from raw (uncracked), thermally cracked and clinoptilolite-cracked oilsand samples indicates that the natural zeolite is an effective cracking catalyst (FIG. 1). The sand from the raw, pentane-extracted sample (A) retained most of its initial structure and colour. In sharp contrast, extraction of the zeolite-cracked sample (C) leaves the sands exhausted and collapsed to its natural state, while the sands from the thermally cracked sample (B) assume an intermediate structure and a colour virtually indistinguishable from the raw oilsands sample. The bituminous liquid collected from the natural zeolite-cracked sample is a deep brown colour, confirming that cracking has resulted in a readily extractable product. The thermally cracked sample has the lowest bitumen content, as demonstrated by the light coloured extract, as thermal cracking releases gases but leaves the remaining products in the oilsands unextractable by light hydrocarbons. The raw sample produces an intermediate-coloured extract because, while no hydrocarbon content has been lost to gas production, most of the bitumen remains insoluble in pentane.

Solvent Extraction

Natural zeolite cracking of oilsands samples results in enhanced extractability and high recovery of both bitumen and gaseous fractions. Table 1 shows the weight percent of bitumen recovered from pentane-, hexane- and toluene-extracted cracked and uncracked oilsands samples. When bitumen is extracted from the sand matrix with pentane, the highest weight percent of bitumen is recovered from the clinoptilolite (New Mexico)-cracked oilsands sample (8.87 wt %). In comparison, the raw, thermally cracked, Na-chabazite-cracked and zeolite Y-cracked samples have recoveries of 7.51, 8.79, 8.65 and 8.03 weight percent of bitumen, respectively. When hexane is used as the extraction solvent, thermally cracked and raw oilsands yield higher bitumen recoveries (9.04 and 8.93 wt %, respectively) than the clinoptilolite-cracked (7.11 and 7.96 wt %) and chabazite-cracked (8.21 and 6.74 wt %) samples. However, average gas production associated with the natural zeolite-catalyzed cracking is generally higher than that from thermal or zeolite Y cracking. In fact, gas production during clinoptilolite-catalyzed cracking may be underreported in Table 1. Despite pressure testing of microbatch reactors at 300 psi prior to cracking reactions, we cannot exclude the possibility that some gaseous products were lost due to very high pressure build-up during the reactions.

TABLE 1

The effect of cracking agents and extraction solvents on bitumen recovery from oilsands samples

| Sample | Average gas production (g/g oilsands) | Bitumen Recovery (wt %) Pentane extracted | Hexane extracted | Toluene extracted |
|---|---|---|---|---|
| Raw oilsands | 0.0000 | 7.51 | 8.93 | 10.44 |
| Thermal cracking | 0.0247 | 8.79 | 9.04 | 8.90 |
| Zeolite Y | 0.0305 | 8.03 | 8.36 | 9.33 |
| Na-chabazite | 0.0465 | 8.65 | 8.21 | 9.22 |
| Ca-chabazite | 0.0338 | 7.63 | 6.74 | 10.04 |
| Clinoptilolite (New Mexico) | 0.0491 | 8.87 | 7.11 | 8.17 |
| Clinoptilolite (Australia) | 0.0267 | 7.71 | 7.96 | 8.28 |

The pentane- and hexane-extracted products from zeolite Y-catalyzed reactions had good recoveries (8.03 and 8.36 wt %, respectively) of bitumen. However, vacuum fractionation of the products (see Table 2(a), (b), and (c), below), reveals that clinoptilolite cracking reduces the heavier hydrocarbons in the sands into smaller components than thermal or zeolite Y-catalyzed reactions. Toluene extraction results in higher bitumen recovery than pentane or hexane extraction, however, toluene is known to co-extract the remaining asphaltenes with the bitumen, which is undesirable for upgrading.

TABLE 2(a)

Boiling point distribution of toluene-extracted products

| Sample | Naphtha: <191° C. (wt %) | Kerosene: 191° C.-277° C. (wt %) | Distillate fuel oil: 277° C.-343° C. (wt %) | Gas oil/lube stock: 343° C.-566° C. (wt %) | Residuum: 566° C.+ (wt %) |
|---|---|---|---|---|---|
| Raw oilsands | — | 0.2 | 0.6 | 33.3 | 65.9 |
| Thermal cracking | — | 0.5 | 8.0 | 49.5 | 42.0 |
| Zeolite Y | — | 0.4 | 6.5 | 50.5 | 42.6 |
| Na-chabazite | — | 0.1 | 8.1 | 52.1 | 39.7 |
| Ca-chabazite | — | 1.5 | 9.4 | 52.4 | 36.7 |
| Clinoptilolite (New Mexico) | 0.2 | 1.1 | 7.3 | 54.2 | 37.2 |
| Clinoptilolite (Australia) | — | 1.6 | 12.7 | 51.4 | 34.3 |

TABLE 2(b)

Boiling point distribution of pentane-extracted products

| Sample | Naphtha: <191° C. (wt %) | Kerosene: 191° C.-277° C. (wt %) | Distillate fuel oil: 277° C.-343° C. (wt %) | Gas oil/lube stock: 343° C.-566° C. (wt %) | Residuum: 566° C.+ (wt %) |
|---|---|---|---|---|---|
| Raw oilsands | — | — | 1.3 | 55.4 | 43.3 |
| Thermal cracking | — | 0.1 | 1.7 | 53.2 | 44.9 |
| Zeolite Y | — | — | 8.0 | 56.2 | 35.8 |
| Na-chabazite | — | 0.4 | 6.5 | 56.9 | 36.2 |
| Ca-chabazite | 0.1 | 0.7 | 9.9 | 53.4 | 35.9 |
| Clinoptilolite (New Mexico) | — | 1.1 | 8.9 | 57.0 | 33.0 |
| Clinoptilolite (Australia) | — | 2.6 | 22.0 | 50.3 | 25.1 |

TABLE 2(c)

Boiling point distribution of hexane-extracted products

| Sample | Naphtha: <191° C. (wt %) | Kerosene: 191° C.-277° C. (wt %) | Distillate fuel oil: 277° C.-343° C. (wt %) | Gas oil/lube stock: 343° C.-566° C. (wt %) | Residuum: 566° C.+ (wt %) |
|---|---|---|---|---|---|
| Raw oilsands | — | 0.1 | 0.7 | 42.9 | 56.3 |
| Thermal cracking | — | 0.5 | 2.8 | 53.7 | 43.0 |

TABLE 2(c)-continued

Boiling point distribution of hexane-extracted products

| Sample | Naphtha: <191° C. (wt %) | Kerosene: 191° C.-277° C. (wt %) | Distillate fuel oil: 277° C.-343° C. (wt %) | Gas oil/lube stock: 343° C.-566° C. (wt %) | Residuum: 566° C.+ (wt %) |
|---|---|---|---|---|---|
| Zeolite Y | 0.1 | 0.4 | 4.9 | 55.5 | 39.1 |
| Na-chabazite | 0.2 | 0.4 | 3.2 | 56.2 | 40.0 |
| Ca-chabazite | 0.1 | 0.9 | 7.2 | 57.3 | 34.5 |
| Clinoptilolite (New Mexico) | 0.2 | 1.1 | 7.3 | 54.2 | 37.2 |
| Clinoptilolite (Australia) | 0.4 | 1.7 | 11.3 | 56.6 | 30.0 |

Characterization and Analysis of Extracted Products

Figure 2:
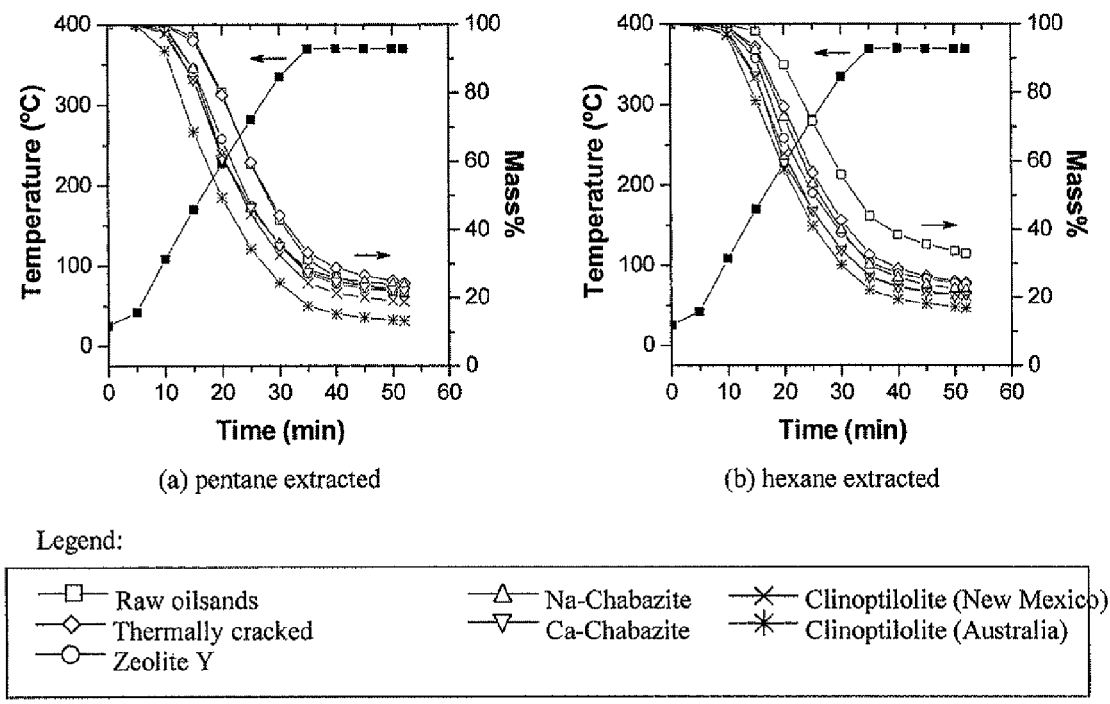
FIG. 2(a) shows the results of selected cracking agents on boiling point distributions of extracted bitumen fractions using pentane.
FIG. 2(b) shows the results of selected cracking agents on boiling point distributions of extracted bitumen fractions using hexane.

Following thermal or catalytic cracking, the bitumen from oilsands samples was extracted with pentane or hexane and evaporated, and the recovered products were analyzed by thermogravimetry. Boiling point distributions of the bitumen samples are shown in FIG. 2. Natural clinoptilolite catalysts crack the bitumen into lighter components than thermal cracking or catalytic cracking with other agents, including commercial zeolite Y. This trend is consistent whether the bitumen is extracted using pentane (FIG. 2(a)) or hexane (FIG. 2(b)).

Pentane-extracted bitumen samples from oilsands cracked with clinoptilolites from Australia and New Mexico, are reduced to 12% and 18% of their respective initial masses after heating under a vacuum to 380° C. In comparison, extracts from raw and thermally cracked oilsands have residual masses of 22% and 25% (FIG. 2(a)). The residual masses from the natural clinoptilolite samples are approximately 4 to 10% lower than those generated by cracking with zeolite Y, and 6 to 11% lower than the calcium and sodium H-chabazite samples; this indicates that the bitumen samples generated using inexpensive clinoptilolite catalysts contain the lightest hydrocarbon fractions. When the cracked samples are extracted with hexane instead of pentane, increased residual masses are observed, indicating that hexane extracts heavier hydrocarbon fractions. After hexane extraction, we observe residual masses of 33% and 25% for raw and thermally cracked oilsands. Hexane extracts of Na-chabazite and Ca-chabazite cracked samples have reduced residuum (22 and 20%, respectively), and consistent with the results from pentane extraction, the lowest residual mass (16%) is observed for samples cracked with Australian clinoptilolite.

Figure 3:
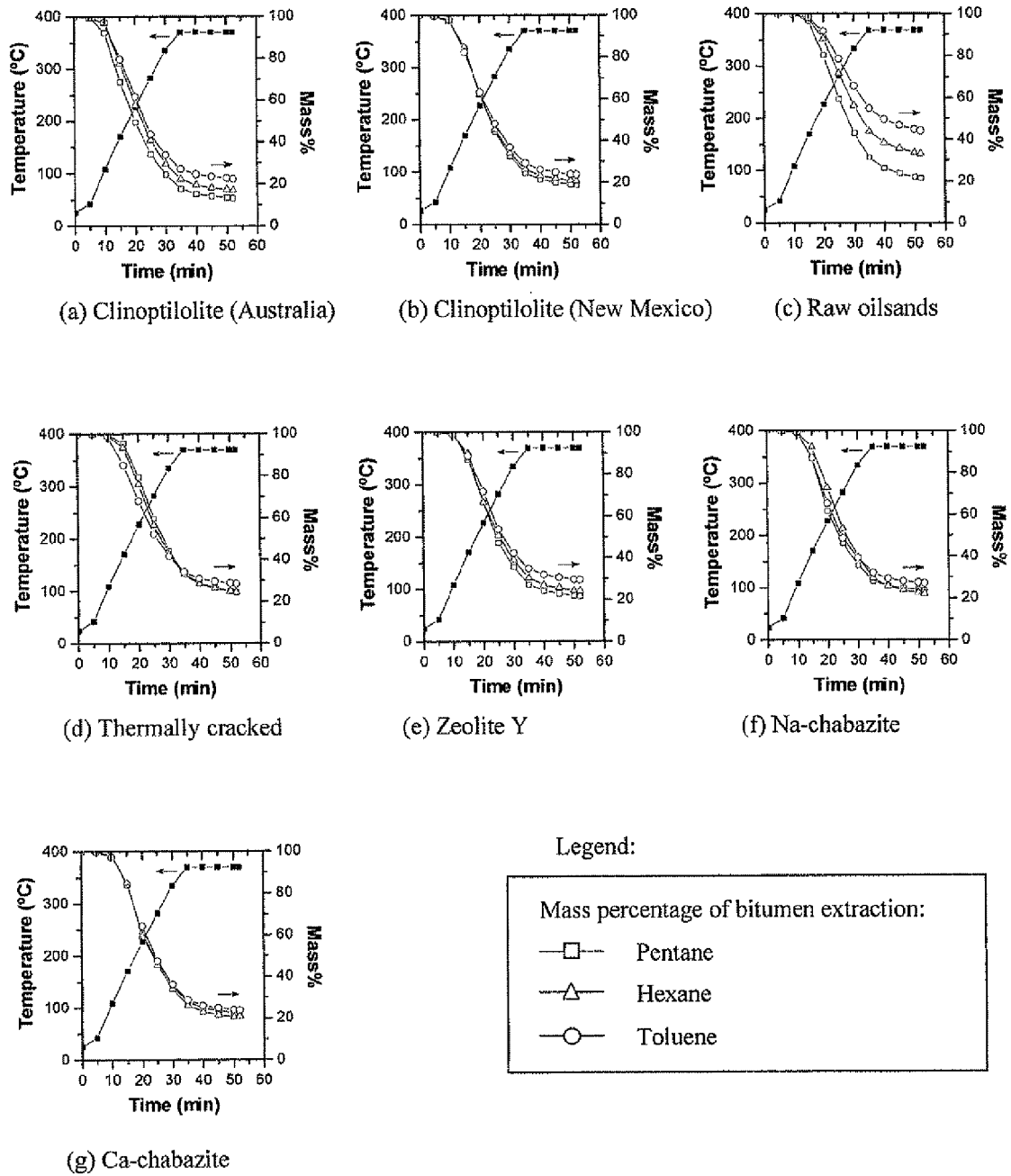
FIG. 3(a) shows the results of selected organic solvents on boiling point distributions of extracted bitumen fractions cracked by Clinoptilolite (Australia)
FIG. 3(b) shows the results of selected organic solvents on boiling point distributions of extracted bitumen fractions cracked by Clinoptilolite (New Mexico)
FIG. 3(c) shows the results of selected organic solvents on boiling point distributions of extracted bitumen fractions of raw oilsands.
FIG. 3(d) shows the results of selected organic solvents on boiling point distributions of extracted bitumen fractions cracked thermally.
FIG. 3(e) shows the results of selected organic solvents on boiling point distributions of extracted bitumen fractions cracked by Zeolite Y.
FIG. 3(f) shows the results of selected organic solvents on boiling point distributions of extracted bitumen fractions cracked by Na-chabazite.
FIG. 3(g) shows the results of selected organic solvents on boiling point distributions of extracted bitumen fractions cracked by Ca-chabazite.

Boiling point distributions of the products of individual cracking reactions demonstrate that pentane and hexane extract lighter hydrocarbons and smaller amounts of residuum from oilsands samples than toluene (FIG. 3). Light hydrocarbon extraction of Australian clinoptilolite-cracked samples produces 12%, 16% and 22% residual masses from pentane, hexane and toluene extracts, respectively, significantly lower residuum than in uncracked, thermally cracked or zeolite Y-cracked samples (FIG. 3(a, c, d and e)). Cracking with clinoptilolite from New Mexico produces similar results: 18%, 21% and 24% residual masses from pentane, hexane and toluene extraction (FIG. 3(b)). In contrast, raw oilsands extracted using toluene reduce to a mass of 43% after distillation under vacuum; when pentane or hexane is used, the residual masses are much lower (22% or 33% respectively; FIG. 3(c)).

When the boiling points of the oilsands extracts under vacuum are converted to atmospheric pressure values in order to approximate standard petroleum fractions, the natural zeolite-cracked products are distributed into much lighter components than raw, thermally-cracked, or zeolite Y-cracked samples (Tables 2 (a), (b) and (c)). In toluene extracts, the raw oilsands sample has the highest residuum content (65.9 wt %), while the clinoptilolite-catalyzed samples have the lowest (37.2 and 34.3 wt %). The reduced residuum content of the clinoptilolite samples corresponds to increases in the lighter naphtha, kerosene and gas oil fractions (Table 2(a)). A higher proportion of lighter fractions is also observed in pentane- and hexane-extracted, natural zeolite-cracked samples than in the corresponding raw, thermally cracked or zeolite Y-cracked oilsands (Table 2(b) and (c)).

Natural zeolite cracking reduces the asphaltene content of bitumen significantly. Asphaltenes are soluble in toluene, but insoluble in lighter n-alkane hydrocarbon (Akbarzadeh et al., 2004). When the bitumen is cracked with clinoptilolite and extracted by lighter hydrocarbons (Table 2(b) and (c)), the residuum content decreases by only 4-9 wt %, compared to the analogous toluene-extracted samples (Table 2(a)), indicating that few asphaltenes remain after the cracking reactions. In contrast, pentane and hexane extraction of raw oilsands reduces the residuum content by 13-23 wt %, compared to toluene extraction, indicating that a significant portion of the asphaltene content of raw oilsands is not extracted using the lighter hydrocarbons.

Comparison of boiling point distributions and bitumen recovery from oilsands samples establishes that natural zeolites break down the heavier hydrocarbons (like asphaltenes) in bitumen into much lighter components than simple thermal cracking or commercial zeolite Y-catalyzed cracking. Light hydrocarbons such as pentane or hexane can selectively extract the commercially valuable fractions from zeolite-cracked samples, leaving the few remaining asphaltenes and other undesirable heavier components in the exhausted sands. This waterless extraction method results in the production of lighter, less viscous and, therefore, more transportable, petroleum fractions that contain a higher proportion of fuel-grade hydrocarbons.

All references mentioned above are incorporated herein by reference in their entirety.

The above-described embodiments of the present invention are intended to be examples only. Alterations, modifications and variations may be effected to the particular embodiments by those of skill in the art without departing from the scope of the invention, which is defined solely by the claims appended hereto.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding Canadian application No. 2,630,075, filed Apr. 28, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for recovering bitumen from a petroleum feedstock, the method comprising the steps of:
    exposing the petroleum feedstock to an acidified zeolite catalyst;
    heating the feedstock and catalyst to a cracking temperature; and
    contacting the cracked feedstock with a light hydrocarbon solvent to extract bitumen therefrom.

2. The method as in claim 1, wherein the feedstock is raw oilsand.

3. The method as in claim 1, wherein the zeolite is a naturally occurring zeolite.

4. The method as in claim 3, wherein the naturally occurring zeolite is chabazite or clinoptilolite.

5. The method as in claim 1, wherein the acidified zeolite is a strong acid.

6. The method as in claim 1, wherein the cracking temperature is suitable to crack asphaltenes within the feedstock.

7. The method as in claim 1, wherein the cracking temperature is a temperature greater than 200 degrees Celsius.

8. The method as in claim 1, wherein the cracking temperature is a temperature greater than 300 degrees Celsius.

9. The method as in claim 1, wherein the light hydrocarbon solvent is pentane or hexane.

10. The method as in claim 1, further comprising the step of cooling the cracked feedstock prior to contact with the solvent.

11. A method for recovering hydrocarbons from asphaltene-bearing feedstock, comprising the steps of:
    exposing the asphaltene-bearing feedstock to an acidified zeolite catalyst;
    heating the feedstock and catalyst to a cracking temperature; and
    contacting the cracked feedstock with a light hydrocarbon solvent to extract soluble cracked products from the feedstock.

12. The method as in claim 11, wherein the feedstock is raw oilsand.

13. The method as in claim 11, wherein the zeolite is a naturally occurring zeolite.

14. The method as in claim 13, wherein the naturally occurring zeolite is chabazite or clinoptilolite.

15. The method as in claim 11, wherein the acidified zeolite is a strong acid.

16. The method as in claim 11, wherein the cracking temperature is suitable to crack asphaltenes within the feedstock.

17. The method as in claim 11, wherein the cracking temperature is a temperature greater than 200 degrees Celsius.

18. The method as in claim 11, wherein the cracking temperature is a temperature greater than 300 degrees Celsius.

19. The method as in claim 11, wherein the light hydrocarbon solvent is pentane or hexane.

20. The method as in claim 11, further comprising the step of cooling the cracked feedstock prior to contact with the solvent.

21. A method for cracking asphaltenes and recovering cracked products, the method comprising the steps of:
    providing a starting material containing asphaltenes;
    exposing the starting material to an acidified zeolite catalyst;
    heating the starting material and catalyst to a cracking temperature to produce a cracked material containing cracking products; and
    contacting the cracked material with a light hydrocarbon solvent to extract soluble cracking products from the cracked material.

22. The method as in claim 21, wherein the zeolite is chabazite or clinoptilolite.

23. The method as in claim 21, wherein the acidified zeolite is a strong acid.

24. The method as in claim 21, wherein the cracking temperature is a temperature greater than 300 degrees Celsius.

25. The method as in claim 21, wherein the light hydrocarbon solvent is pentane or hexane.

26. In a method of catalytic cracking of asphaltenes, wherein the improvement is catalyzing the cracking with an acidified natural zeolite catalyst.

27. The method of claim 26, wherein the zeolite is clinoptilolite or chabazite.

* * * * *